Dec. 11, 1962  G. D. BALDWIN  3,067,974
RUBBER MOUNTING GROMMET FOR TRUCK LIGHT
Filed Aug. 9, 1960
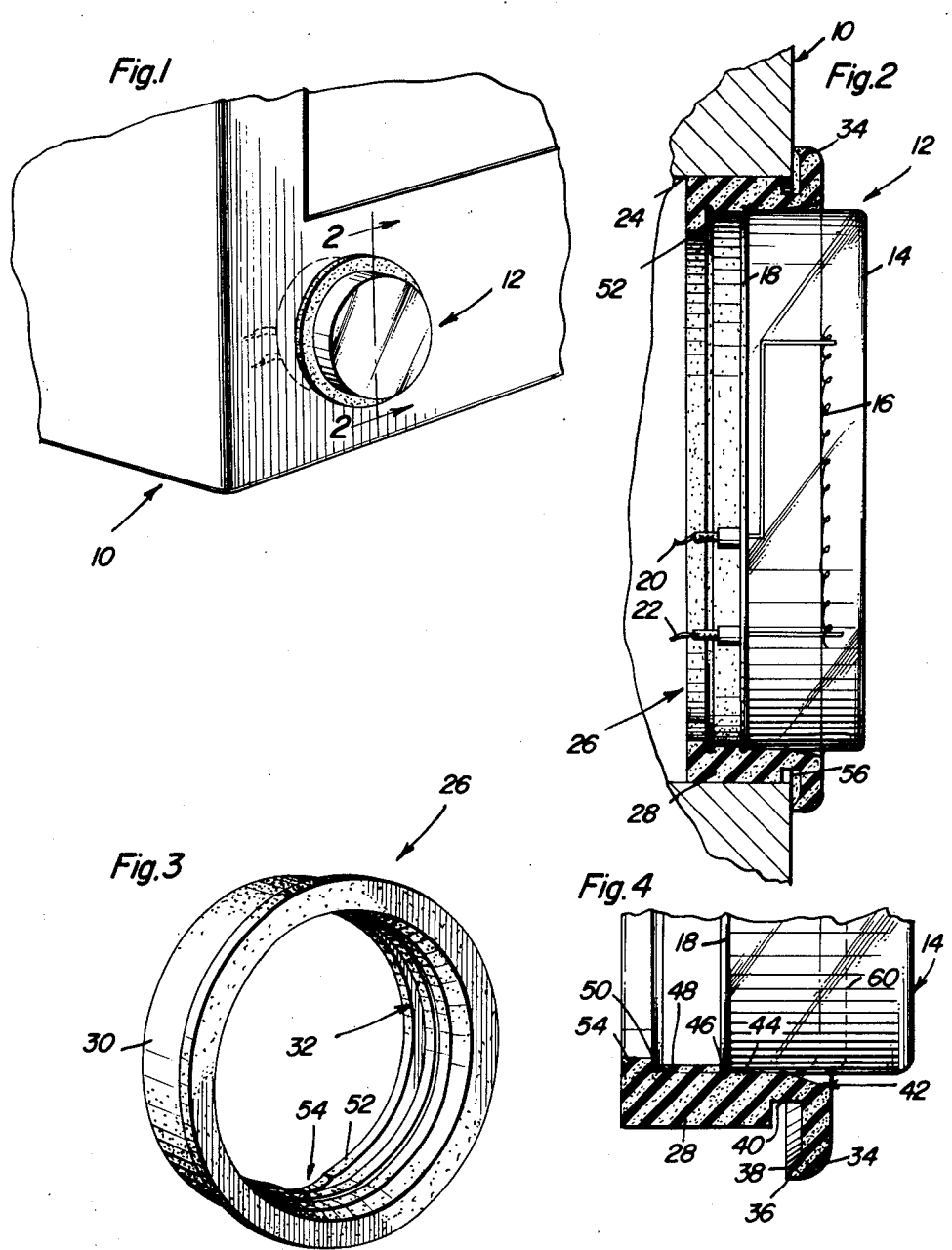
George D. Baldwin
INVENTOR.

United States Patent Office 3,067,974
Patented Dec. 11, 1962

3,067,974
RUBBER MOUNTING GROMMET FOR TRUCK LIGHT
George D. Baldwin, Jamestown, N.Y., assignor to Truck-Lite Co., Inc., Jamestown, N.Y., a corporation of New York
Filed Aug. 9, 1960, Ser. No. 48,425
8 Claims. (Cl. 248—27)

This invention relates generally to vehicle illuminating equipment and more particularly to means for mounting a clearance light on a truck body.

State laws require that a minimum number of clearance lights be properly mounted on the body of a truck for assuring that the truck may be properly seen at night. In recent years, the industry has developed several new forms of clearance lighting fixtures for trucks which are used instead of the older clearance lights which employed bulbs which were screwed into sockets or bulbs and sockets having cooperating bayonet connections. Recently, in order to facilitate replacement of lights and assure longer life thereof, sealed casings have been provided which are mounted on the truck body in such a manner as to prevent the light elements from being subjected to undue vibrations. In view of this, it is the principal object of this invention to provide novel mounting means for use in combination with a light casing for mounting the casing on a truck body without requiring the use of screws or other fastener elements.

It is often desirable to utilize clearance lights which provide edge light in addition to the normal forward illumination. However, sometimes when the casing of the clearance light is extended from the track body to such an extent that edge light is provided, an undesirable hazard is presented to the casing as, for example, by loading platforms which may damage the casing when the truck is being backed up thereto. The mounting means provided herein allow for the selective positioning of the light casings so as to present edge light or to cause the casing to be recessed whereas the front face thereof projects little further than the truck body.

It is a still more particular object of this invention to provide novel clearance light mounting means for trucks which utilize a rubber grommet secured in an opening in the truck body. The grommet holds the clearance light casing without requiring the use of fasteners. Further, the grommet prevents undue vibrations from being impressed upon the light. Moreover, it facilitates the removal and installation of the light and minimizes damage to the light casing upon engagement with objects such as loading platforms.

These, together with other objects and advantages which will become subsequently apparent, reside in the details of construction and operation as more fully hereinafter described and claimed, reference being had to the accompanying drawings forming a part hereof, wherein like numerals refer to like parts throughout, and in which:

FIGURE 1 is a fragmentary perspective view of a portion of a truck construction illustrating how the mounting means are employed for mounting a light on the truck body;

FIGURE 2 is an enlarged vertical sectional view taken substantially along the plane 2—2 of FIGURE 1;

FIGURE 3 is a perspective view of the mounting means comprising the rubber grommet fixed within an opening in the truck body for retaining a light casing; and FIGURE 4 is an enlarged fragmentary view illustrating the various positions which the light casing may assume within the mounting means.

With continuing reference to the drawings, numeral 10 generally indicates the van portion of a truck body upon which it is necessary to mount clearance lights, as 12. We are here concerned particularly with the mounting of a clearance light 12 of the type which includes a light transmitting plastic cylindrical casing 14 within which is disposed an illuminating filament 16 or some other form of illuminating means. The cylindrical casing 14 is provided with a circumferential rib, bead or ridge 18 which is continuous and positioned on the rear portion of the casing 14. The filament 16 may be energized through conductors 20 and 22. It is desired to mount the clearance light 12 on the van portion of the truck body 10.

The truck body 10 defines an opening 24 therein in which the light 12 is to be mounted. For this purpose, the mounting means comprising a rubber grommet 26 is provided. The rubber grommet 26 includes a cylindrical wall 28 defining both an outer surface 30 and an inner surface 32. An outwardly extending annular flange 34 is terminally and integrally formed on the cylindrical wall 28. Attention is particularly called to FIGURE 4 for a detailed view of the construction of the grommet 26. Representative dimensions will be given for the purpose of showing the relationships of the various surfaces of the grommet 26 and it will of course be understood that the dimensions set forth are not to be construed as the only ones to be utilized. It is contemplated that the diameter across the outer edge of the flange 34 be 5¼ inches. The diameter of the outer surface 30 of the cylindrical wall 28 is to be 4¹³⁄₁₆ inches. The flange 34 comprises a rearwardly directed lip 36 which is beveled, as indicated at 38. An annular indentation, groove or channel is formed between the flange 34 and the cylindrical wall 28 with the diameter of the surface 40 being a maximum of 4³³⁄₆₄ inches. The wall of the van portion of the truck body 10 is, of course, received in the indentation against the surface 40. The width of the indentation is, of course, sufficient to receive the wall adjacent the opening 24 therein, with the flange 34 and lip 36 thereof bearing against the wall of the truck body. The inner surface 32 of the cylindrical wall 28 is provided with a flared lip or mouth portion 42 which forms a 15° angle with respect to a first flat annular surface 44. The flat annular surface 44 has a diameter of 4¼ inches and immediately adjacent thereto a first annular recess 46 is formed. The recess 46 extends .025 inch from the flat annular surface 44 and then up to a second flat annular surface 48 which, as is to be noted in FIGURE 4, has a diameter slightly less than the diameter of the first flat annular surface 44. A second annular recess 50, identical to the recess 46, is formed adjacent the second flat annular area 48. An inwardly directed flange 52 having a diameter of 3⅞ inches is formed adjacent the second annular recess 50 and terminally and integrally with respect to the cylindrical wall 28. Inwardly directed flange 52 extends along the major part of the cylindrical wall 28 but a portion, as at 54, is notched out.

In use, the grommet 26 is secured in the truck body 10 as by receiving the wall portion 56 adjacent the opening 24 in engagement with the surface 40 in the indentation between the flange 34 and the cylindrical wall 28 of the grommet 26. It of course will be appreciated that once the grommet 26 is fixed in place, it is substantially immovable as both the forward edge on the cylindrical wall 28 and the lip 36 on the flange 34 engage the wall portion 56 of the truck body 10. The casing 14 having the ridge 18 which is rounded at its outer surface is pressed into the grommet 26 over the flared lip 42 which facilitates the movement of the casing 14 into the grommet. The ridge 18 is pressed rearward over the first annular flat surface 44 and received in the first annular recess 46. It will be noted in FIGURES 2 and 4 that with the ridge 18 received in the annular recess 46, the casing 14 projects beyond the flange 34 and, accordingly, provides edge light inasmuch as the entire casing is formed of light transmitting plastic. If, due to the possibility of breakage when engaged with such as a loading platform, the user desires that the casing 14 be further recessed, sufficient pressure on the casing 14 will move the casing 14 to the dotted line position designated by the numeral 60 in which the ridge 18 is received in the annular recess 50. With the ridge 18 received in the annular recess 50, the possibility of breakage of the casing 14 is minimized.

Whether retained in either of the positions illustrated in FIGURE 4, the casing 14 is securely held and it is substantially impossible to remove the casing 14 from the outer side of the grommet 26. In order to remove the casing 14 from the grommet 26, hand pressure must be applied in the area of the notch 54 in the inwardly directed flange 52. The casing 14 may be projected forwardly by pushing the bottom of the casing to initially dislodge the ridge 18 from the particular recess in which it is received. In any event, the grommet 26 normally holds the casing 14 securely and prevents it from receiving excess vibrations. Regardless of which position the ridge 18 is disposed, engagement of the casing 14 with such as a loading platform will generally cause the platform to push the casing 14 back through the grommet 26 over the flange 52. Since the casing 14 is generally formed of unbreakable plastic, the casing 14 will generally be completely forced through the grommet 26 before it breaks.

It will therefore be appreciated that the mounting means provided allow for the mounting of a clearance light casing in either of two selective positions. Moreover, inasmuch as the grommet is open at the rear, the possibility of damage to the casing is minimized since the casing will generally be pressed through the grommet before breaking. The use of a grommet as indicated allows for the elimination of all types of fasteners and assures that parts will not be damaged due to rusting, etc.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a vehicle having a wall defining an opening, means for mounting in said opening a light casing having a peripheral ridge, comprising a mounting grommet open at both ends and including a peripheral wall having an outwardly directed flange terminally fixed thereto, said peripheral wall being secured in said opening with said outwardly directed flange engaged with said vehicle wall, said peripheral wall defining a pair of spaced annular recesses on the inner surface thereof, said ridge received in one of said recesses.

2. In combination with a vehicle having a wall defining an opening, means for mounting in said opening a light casing having a peripheral ridge, comprising a mounting grommet including a peripheral wall having an outwardly directed flange terminally fixed thereto, said peripheral wall being secured in said opening with said outwardly directed flange engaged with said vehicle wall, said peripheral wall defining a pair of spaced annular recesses on the inner surface thereof, said ridge received in one of said recesses, and an inwardly directed flange terminally fixed to said wall along a major portion thereof remote from said outwardly directed flange.

3. A rubber grommet open at both ends and comprising a cylindrical wall defining a flared lip portion on the inner surface thereof, a first flat annular area adjacent said flared lip portion, a first annular recess adjacent said first flat annular area, a second flat annular area of a lesser diameter than said first area adjacent said first annular recess, and a second annular recess adjacent said second flat annular area.

4. For mounting in a wall opening a circular light casing including a circumferential rib, a resilient, essentially cylindrical grommet insertable in the opening for longitudinally slidably adjustably receiving the light casing, said grommet having longitudinally spaced, circumferential grooves therein in which the rib is selectively receivable for releasably anchoring the light casing in adjusted position.

5. For mounting in a wall opening a circular light casing including a circumferential rib, a resilient, essentially cylindrical grommet insertable in the opening for longitudinally slidably adjustably receiving the light casing, said grommet having longitudinally spaced, circumferential grooves therein in which the rib is selectively receivable for releasably anchoring the light casing in adjusted position, said grommet being open at both ends for the passage of the light casing therethrough.

6. A mount in accordance with claim 5, said grommet including resilient stop means for yieldingly arresting the light casing.

7. A mount in accordance with claim 6, wherein said means comprises a circumferential flange in an end portion of the grommet in the path of the light casing for engagement thereby.

8. For mounting in a circular wall opening a cylindrical light casing including a circumferential rib on one end portion, a resilient, essentially cylindrical grommet insertable in the opening and open at both ends for the reception and passage of the light casing, said grommet including an internally flared end portion to facilitate inserting the light casing, a resilient flange in the other end portion of the grommet for yieldingly arresting the light casing, said grommet having therein a plurality of longitudinally spaced circumferential grooves in which the rib is selectively receivable for releasably securing the light casing in longitudinally slidably adjusted positions in the grommet, and means for securing the grommet in the opening.

References Cited in the file of this patent
UNITED STATES PATENTS
2,860,233    Johnson _____ Nov. 11, 1958